United States Patent [19]

Appelt

[11] 3,886,524

[45] May 27, 1975

[54] ASYNCHRONOUS COMMUNICATION BUS

[75] Inventor: Daren R. Appelt, Houston, Tex.

[73] Assignee: Texas Instruments Incorporated, Dallas, Tex.

[22] Filed: Oct. 18, 1973

[21] Appl. No.: 407,761

[52] U.S. Cl. .......................... 340/172.5; 340/172.5

[51] Int. Cl. .......................................... G06f 15/16

[58] Field of Search ................... 340/172.5, 147 LP; 179/15 R

[56] References Cited

UNITED STATES PATENTS

| | | | |
|---|---|---|---|
| 3,336,582 | 8/1967 | Beausoleil et al. | 340/172.5 |
| 3,699,529 | 10/1972 | Beyers et al. | 340/172.5 |
| 3,710,324 | 1/1973 | Cohen et al. | 340/172.5 |
| 3,710,351 | 1/1973 | Nakamura | 340/172.5 |
| 3,742,148 | 6/1973 | Ledeen et al. | 340/172.5 X |

*Primary Examiner*—Raulfe B. Zache
*Attorney, Agent, or Firm*—Harold Levine; Rene' E. Grossman; Thomas G. Devine

[57] ABSTRACT

An asynchronous bus for self-determined priority of communication among master computer devices communicating with slave devices through said bus where a multi bit data channel and a multi bit address channel are shared between all of said devices.

A logic circuit in each said master device is connected to each of three signal lines common to all logic circuits in all of said master devices. One of the three lines is connected in series in the order of assigned priority between master devices.

Means are provided to actuate the logic circuits via the three signal lines to limit access to said bus in the order of assigned priority and to signal to other master units bus availability and to transmit an access granted signal to master units down stream of a user unit with only one logic gate delay per downstream unit.

11 Claims, 6 Drawing Figures

ASYNCHRONOUS COMMUNICATION BUS

This invention relates to an asynchronous bus method and system for self-determined communication between master computer devices and slave devices. In a more specific aspect, the invention relates to a distributed logic system for assigning priority among master devices on a common bus.

In operation of general purpose digital computers, it is often required that a number of master devices be able to communicate to a number of slave devices over a common bus system. In a typical example, representative of computer systems currently in use, the communication bus between master and slave units comprises a data channel of 16 parallel data lines and an address channel of 20 parallel address lines together with additional control lines. Typically, lines in the data channel, lines in the address channel and the control lines total about 80 in number. Such systems involve the use of a central set of digital logic to perform all the tracing among requests entered into the system by various master units for access to the bus for the transfer of address or data information. U.S. Pat. No. 3,710,324 to Cohen et al discloses such a system.

The present invention is directed to a system in which arbitration logic networks are distributed throughout the system. Like logic sets are provided at each master station in order to perform arbitration between requests from several master stations in the system.

More particularly in accordance with this invention an asynchronous bus is provided for self-determined priority of communication among master computer devices communicating with slave devices through the bus where a multi bit data channel and a multi bit address channel are shared between all of the devices.

A logic circuit is provided in each master device with three signal lines common to all logic circuits in all of the master devices with one of the lines connected in series in the order of assigned priority between the master devices.

Means are then provided to actuate the logic circuits via the three signal lines to limit access to the bus in the order of assigned priority and to communicate to other master units requesting access to the availability of the bus.

The novel features believed characteristic of the invention are set forth in the appended claims. The invention itself, however, as well as further objects and advantages thereof, will be best understood by reference to the following detailed description of an illustrative embodiment, when read in conjunction with the accompanying drawings, wherein:

FIGURE 1

Figure 1:
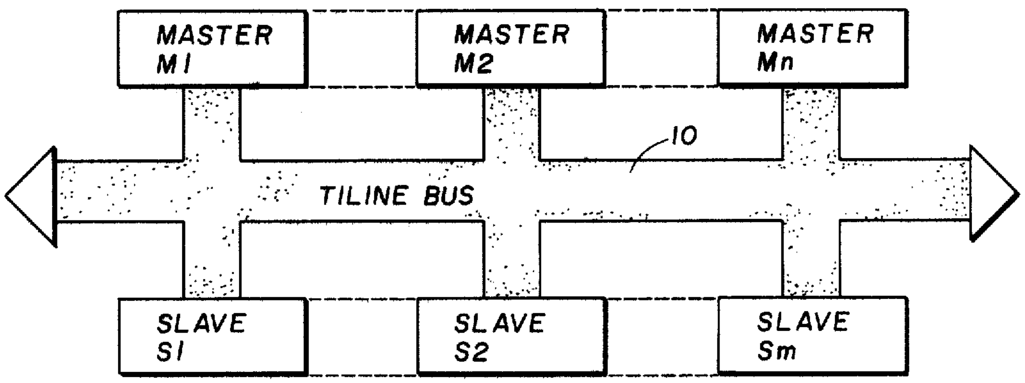
FIG. 1 is a block diagram illustrating a plurality of master and slave devices accessed over a common bus.

FIG. 1 illustrates a typical system in which master devices M1, M2, —Mn are connected to a bus 10 and are to communicate with slave devices S1, S2, —Sm also connected to bus 10. It is to be understood that in operation of such a system only one master at a time may use bus 10 and that some form of arbitration between requests must be established. The present invention is directed to a new and distributed method and system for permitting self-determination of the communication between master and slave by way of a single bus 10.

FIGURE 2

Figure 2:
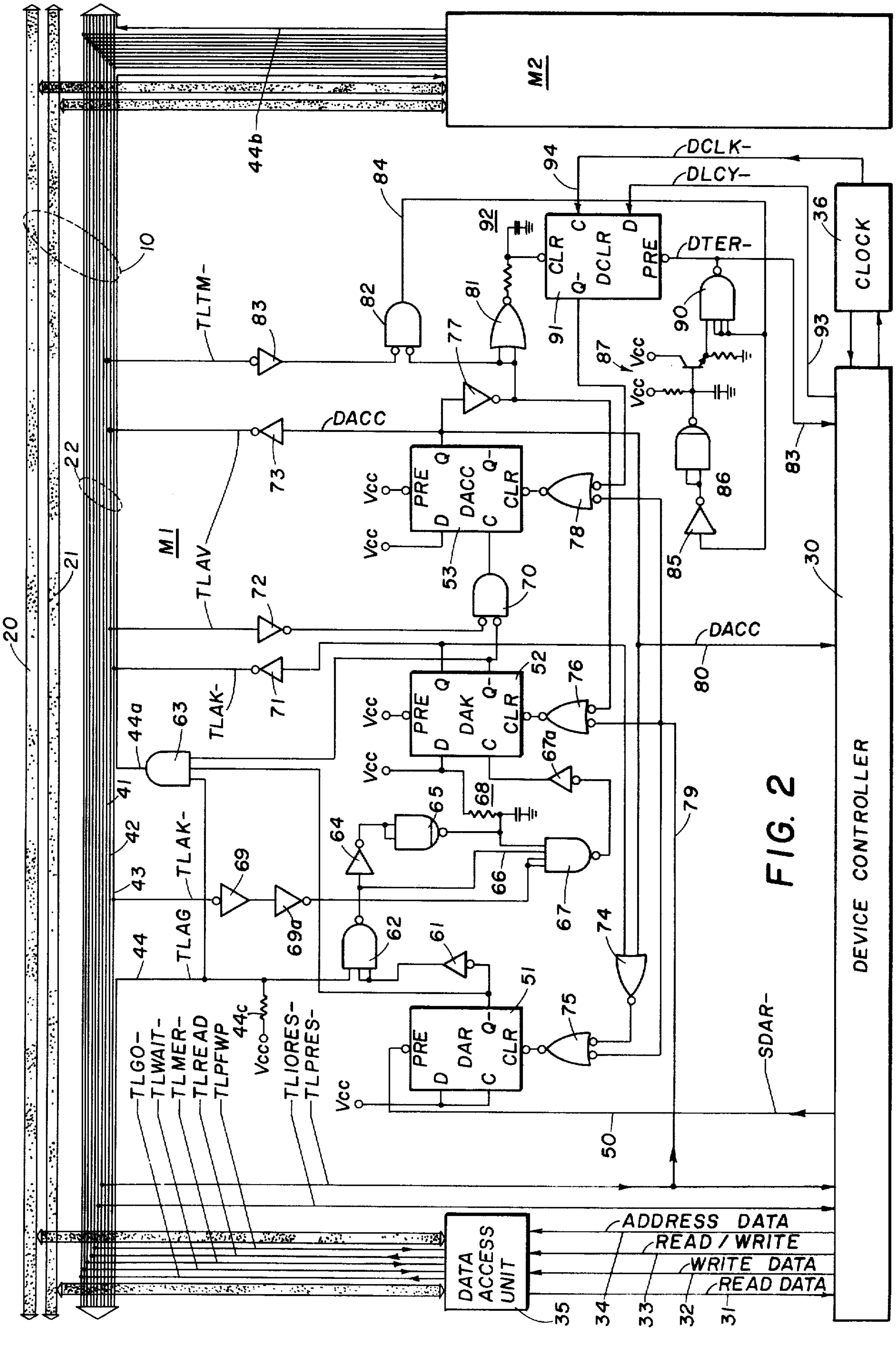
FIG. 2 illustrates in detail the logic included in each of a plurality of master units which are to communicate by way of a common bus.

FIG. 2 illustrates an embodiment of the system in which a data channel 20 and an address channel 21 are connected to master units M1 and M2. They are also connected to other master units and to slave devices in the manner illustrated in FIG. 1.

In this embodiment, it will be assumed that the data bus 20 includes 16 parallel lines, all of which are connected to each of the master and slave units M1, M2, —Mn and S1, S2, —Sm. Address channel 21 is assumed to include 20 parallel lines all of which are connected to all the master and slave units. In addition to lines 20 and 21, eleven additional lines 22 are provided for use in operation of the system. Data lines 20, address lines 21 and control lines 22 form bus 10 of FIG. 1.

In the general case, a master unit such as unit M1 includes a device controller 30 which may be a CPU in a general purpose digital computer, or it may be a peripheral device. Controller 30 is connected by way of lines 31-34 to a data access logic unit 35. The data channel 20 and address channel 21 are connected to the master unit M1 by way of the data access logic unit 35. A system clock 36 is connected to controller 30.

The arbitration system illustrated in FIG. 2 operates in a primary sense in dependence upon signals on lines 41—44. In referring to signals herein, a complement will be signified by a mnemonic followed by a bar (-). Line 41 is a terminate line delivering from a slave to a master a signal that a data transfer has been completed, namely a signal TLTM- which is the complement of the signal TLTM.

Line 42 is a channel which conveys a signal indicating that the bus is available to a master. This signal, TLAV, is transmitted from master to master over line 42.

Line 43 is an acknowledge line conveying a signal indicating that access granted is acknowledged. This signal, TLAK-, is transmitted from master to master.

Line 44 transmits a signal from master to master to indicate when access has been granted, namely signal TLAG.

It should be noted that at the highest priority master, TLAG has no source. For that master, TLAG is always true due to a pullup resistor 44c connected to *Vcc*.

The system operation in arbitration involves four distinct states. The four states are: (*a*) device idle state; (*b*) device access request state: (*c*) device acknowledge state; and (*d*) device access state.

The systems operate in conjunction with and through actuation of the logic built around three flip-flops 51, 52 and 53. In the first or idle state, all three flip-flops 51-53 are clear. In the second or device request state, flip-flop 51 is set. In the third or device acknowledge state, flip-flop 52 is set. In the fourth or device access state, flip-flop 53 is set.

The system includes a line 50 which is connected to the preset terminal of flip-flop 51. Controller 30 generates an access request signal SDAR- on line 50 to initiate an access operation. The Q- output terminal of flip-flop 51 is connected through an inverter 61 to inputs of an NAND gate 62. The other input of the NAND gate 62 is connected to line 44.

The Q- output of flip-flop 51 is also connected to an input of an AND gate 63. The output of AND gate 63 is line 44*a* that extends to the next master unit M2 with the communication bus. Line 44*b* extends from master unit M2. The output of AND gate 62 is connected by way of an inverter 64 to a NAND gate 65. The output of AND gate 62 is also connected by way of line 66 to an input of the NAND gate 67. Line 43 is connected by way of an inverting receiver 69 and an inverter 69*a* to an input of NAND gate 67. The output of NAND gate 65 is connected by way of an RC delay circuit 68 to an input of NAND gate 67. The output of NAND gate 67 is connected by way of inverter 69 to the clock input of flip-flop 52.

The Q- output of flip-flop 52 is connected to one input of a NOR gate 70 and to one input of AND gate 63. The third input of AND gate 63 is connected to line 44.

The Q output of flip-flop 52 is connected by way of an inverter driver 71 to line 43. The second input of NOR gate 70 is connected by way of an inverting receiver 72 to line 42. The output of NOR gate 70 is connected to the clock input terminal of flip-flop 53. The Q output terminal of flip-flop 53 is connected to one input of NOR gate 74, and by way of an inverting driver 73 to line 42. The output of NOR gate 74 is connected to one input of an AND gate 75 the output of which is connected to the clear terminal of flip-flop 51. The second input to NOR gate 74 is supplied from the Q output terminal of flip-flop 52. The clear terminal of flip-flop 52 is supplied by way of an AND gate 76, one terminal of which is supplied from the Q output terminal of flip-flop 53 by way of an inverter 77. The clear input terminal of flip-flop 53 is supplied by way of an AND gate 78. One input of each of gates 75, 76 and 78 is supplied by way of line 79 which is a power reset line in set 22. A zero state on the line 79 will force the entire unit to an idle state regardless of the point that it may be in its program.

The Q output terminal of flip-flop 53 appears on line 80 which is the device access line leading to controller 30. The output of inverter 77 is also connected to the input of a NOR gate 81 and to one input of a NOR gate 82. The second input of NOR gate 82 is supplied by way of an inverting receiver 83 from line 41.

The logic circuitry connected to the output of gate 82 serves the purpose of freeing communication bus 10 in the event that a given master unit has gained access to bus 10, but does not utilize the same. This circuit operates to generate a device timing error signal on an output line 83 leading to controller 30. More particularly, line 41 signals activity on the communication bus. In the absence of such signal, a one state on line 84 is applied to the input of the timing circuit including an inverter 85, a NAND gate 86, an RC delay network and a NAND gate 90. The output of NAND gate 90 is connected to line 83 which also is connected to the preset terminal of a flip-flop 91. The clear terminal of flip-flop 91 is supplied by way of an RC delay network 92. The Q- output terminal of flip-flop 91 is connected to the second input of AND gate 78. The output of NOR gate 82 appearing on line 84 is applied along with the output of the RC delay circuits 87 to inputs of NAND gate 90.

The D input terminal of flip-flop 91 is supplied by way of line 93 leading from the device controller 30.

The clock input terminal of flip-flop 91 is supplied by way of line 94 leading from system clock 36.

The construction and interconnection between data lines 20, address lines 21, the data access logic 35, the device controller 30 and clock 36 is generally the same as found in general purpose computer installations. Systems including computers of the IBM 360 series, Digital Equipment Corporation, computer model PDP 11 and others, find this arrangement embodied therein. For this reason, details of units 30, 35 and 36 will not be described here.

With the connections in the series line 44 leading through AND gate 63 to line 44*a* in unit M1 and thence to unit M2, unit M1 has higher priority than unit M2. Any other master units having priority higher than the priority of unit M1 would be connected in line 44 upstream of unit M1.

The embodiment as above described forms a system which will be referred to as a TILINE bus. Thus, the TILINE bus is a high-speed 16 bit data transfer bus and associated address and control lines, and a set of master logic. It may serve to transfer data between high-speed system elements such as a central processor, memory, and high-speed peripherals such as disc files and magnetic tape transports. The TILINE bus also serves as a computer to computer link and may be the backbone of multiprocessor systems.

The TILINE bus is asynchronous. The speed of data transfers over the TILINE bus is determined by distance and the speed of the devices interfaced to it. Consequently, system performance can be tailored to the application by suitable choice of elements.

Devices interfaced to the TILINE bus compete for access on a priority basis. High-speed peripherals are preferably assigned highest priority and the central processor is assigned the lowest. In operation, an efficient cycle-stealing action occurs. The overhead in switching from a CPU access to another device is on the order of 60 nanoseconds. This allows a very high rate of device switching without sacrificing a great deal of overall data bandwidth.

A TILINE bus is utilized as the sole path of data communication between all high-speed system elements. A computer front panel console, a CPU mainframe, main memory banks, and all high-speed peripheral devices such as disks and tape drives will be directly interfaced to the TILINE bus. Slower peripherals may be interfaced through Communication Register Units.

TILINE master devices control data transfers. TILINE slave devices generate or accept data in response to some master. Data transfers in either direction always occur between one master and one slave. The CPU is an example of a master device and a memory module is an example of a slave device. All slave devices recognize and are activated by specific addresses. For example, a memory module is activated when some master device does a read from an address within the boundaries of that memory module. The system permits only one slave to recognize any particular address. In the case of memory modules, preset addresses may indicate the starting address and size of the module.

The description which follows defines the 47 signal lines which comprise the TILINE bus. The signals are described in three groups acccording to their function. The signals associated with I/O data transfer operations are defined in one group. Those associated with the acquisition of bus mastership are defined in a second group. Miscellaneous signals which serve special purpose functions are defined in the third group.

Table 1 lists each TILINE bus signal along with a brief description and logic convention. Forty signals are utilized exclusively for I/O data transfer operations in this embodiment of TILINE bus 10 described herein. Thirty-six of the 40 signals are grouped together in two sub-bus configurations for the transfer of a 20 bit address and 16 bits of data while the remaining four signals are primarily utilized for control of the actual transfer operations. All signals are transmitted and received between a TILINE master device and a TILINE slave device as defined in Table 1.

TABLE 1

| SIGNAL | TILINE SIGNALS DESCRIPTION |
|---|---|
| TLGO- | Go: From master to slave, initiates a data transfer. |
| TLTM- | Terminate: From slave to master, completes a data transfer. |
| TLADR00- | MSB |
| TLADR01- | |
| TLADR02- | |
| TLADR03- | |
| TLADR04- | |
| TLADR05- | |
| TLADR06- | |
| TLADR07- | |
| TLADR08- | Address Lines: From master |
| TLADR09- | to slave. |
| TLADR10- | |
| TLADR11- | |
| TLADR12- | |
| TLADR13- | |
| TLADR14- | |
| TLADR15- | |
| TLADR16- | |
| TLADR17- | |
| TLADR18- | |
| TLADR19- | LSB |
| TLDAT00- | MSB |
| TLDAT01- | |
| TLDAT02- | |
| TLDAT03- | |
| TLDAT04- | |
| TLDAT05- | |
| TLDAT06- | Data Lines: From master |
| TLDAT07- | to slave. |
| TLDAT08- | |
| TLDAT09- | |
| TLDAT10- | |
| TLDAT11- | |
| TLDAT12- | |
| TLDAT13- | |
| TLDAT14- | |
| TLDAT15- | LSB |
| TLMER- | Memory Error: From slave to master. |
| TLREAD | Read Control: From master to slave. |
| TLAG | TILINE Access Granted: From master to master, establishes master priority. |
| TLAK- | Access Granted Acknowledge: From master to master. |
| TLAV | TILINE Available: From master to master. |
| TLPRES- | Power Master Reset: From power supply to all other modules. |
| TLPFWP | Power Failure Warning Pulse: From Power Supply to all masters. |
| TLIORES- | Input/Output Reset: From CPU to all other masters. |
| TLWAIT- | TILINE Wait Signal: From |

TABLE 1-Continued

| SIGNAL | TILINE SIGNALS DESCRIPTION |
|---|---|
| | TILINE EXPANDERS and SWITCHES to all other modules. Used to resolve system to system communication deadlocks. |
| GROUND | Signal and Power Ground. |

In operation device controller 30, when it requires access to the bus 10, generates a signal SDAR- which is applied to the preset input terminal of the flip-flop 51. Thus, device controller 30 generates SDAR- when a memory cycle is to be carried out. Upon appearance of the SDAR- logic state, the flip-flop 51 is actuated so that the Q- signal therefrom applied to AND gate 63 is enabled. This will be true if the signal from AND gate 75 is high. However, if the logic is already involved in a previous request, then the output from the AND gate 75 will be low and the request from the device controller 30 will then be automatically deferred until the logic has completed the previously initiated operation. The Q- output of flip-flop 51 is also connected through inverter 61 to NAND gate 62. The signal TLAG is also applied to NAND gate 62. The output of NAND gate 62 is then connected to a timing network which includes the inverter 64, NAND gate 65, NAND gate 67 and the timing network 68. The delayed signal as applied from the output of NAND gate 67 and inverter **67*a* to the second flip-flop 52 is 200 nanoseconds in length. It will be noted that the signal TLAK- is applied by way of inverting receiver 69 and inverter 69*a* to the NAND gate 67. If the TLAK- signal goes high after the expiration of the 200 nanosecond delay, then the flip-flop 52 will be set. When flip-flop 52 is set, the Q output goes high and the Q- output goes low. The Q- output is then anded in AND gate 63 with the Q- output of flip-flop 51 and the TLAG signal from line 44. The immediate effect of setting flip-flop 52 is to clear the DAR flip-flop 51. This is accomplished through NOR gate 74 and AND gate 75 clears the flip-flop 51. At the same time, the Q output of flip-flop 52 is connected to inverter driver 71 to the TLAK line 43. This causes line 43 to go low, thereby signaling to all other masters on the system that master M1 is then in an acknowledge state. Thereafter, the transfer from the acknowledge state to the access state is dependent upon line 42 on which signal TLAV appears to go high. This signal is applied by way of inverting receiver 72 to NOR gate 70 which leads to the clock input terminal of flip-flop 53. In the access state, master M1 can proceed with a data transfer over the TILINE bus 10. At the end of the operation during which an information transfer is carried out under M1 control for the benefit of device controller 30, the controller 30 will generate a signal DLCY on line 93, which is connected to the D input terminal of flip-flop 91. This signal indicates that the controller 30 has completed as desired the utilization of the TILINE 10, and thus in a state to relinquish TILINE 10. Upon the occurrence of the next succeeding device system clock pulse DCLK-, flip-flop 91 is set causing the Q- output to go low. This clears flip-flop 53, taking the access control logic out of the access state. When flip-flop 53 is cleared, this causes the flip-flop 91** to be cleared. This resetting operation is carried out by a state propagated by the inverter 77, NOR gate 81, and the timing network 92.

In order to assure the integrity of the TILINE bus, the logic of FIG. 2 monitors the use of the bus by a given master. This is done during the access state by measuring the activity of the TLTM- line 41. The signal TLTM- is generated in response to activity in the transfer of data over the bus 10. If no activity occurs for a period of 10 microseconds, then the logic for the system M1 is automatically cleared to its idle state. This is accomplished by utilizing the Q output of flip-flop 53 into NOR gate 82 along with the TLTM-, and then applying the output of NOR gate 82 by way of line 84 to the system including the timing network 87. The output of NAND gate 90 is a logic low signal DTER-. This signal sets flip-flop 91 and applies a device timing error signal to the controller 30 by way of line 83. This forces the logic to its idle state.

Figure 3:
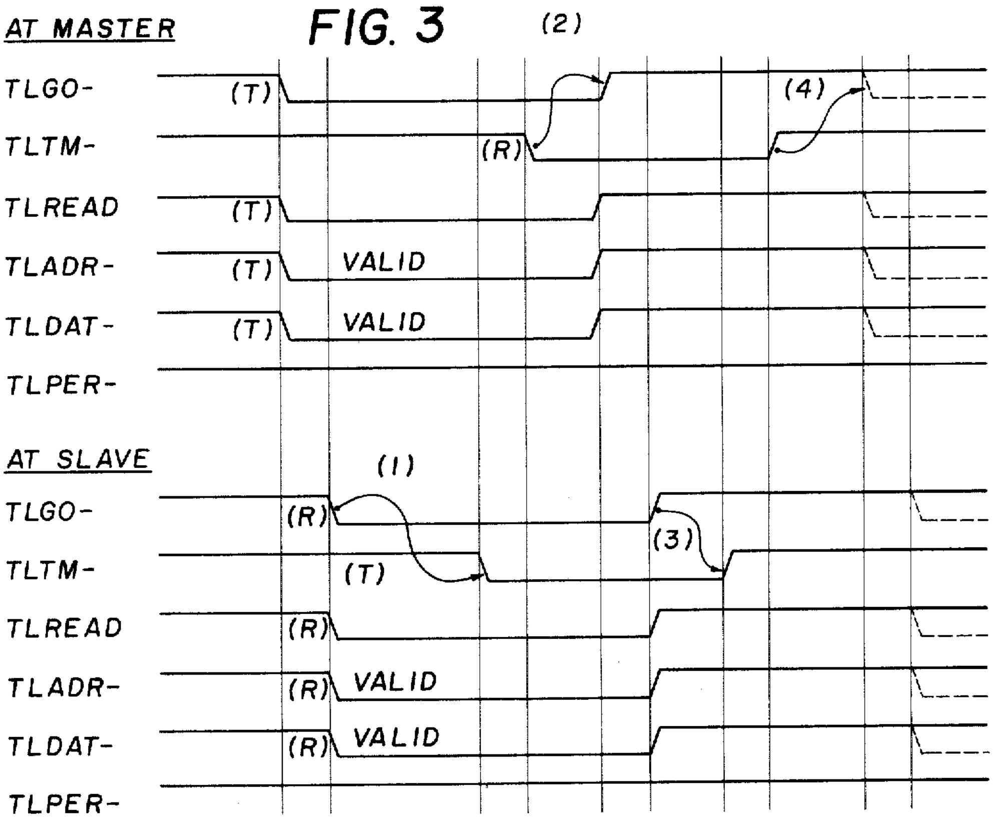
FIG. 3 is a timing diagram of a memory write operation.
Figure 4:
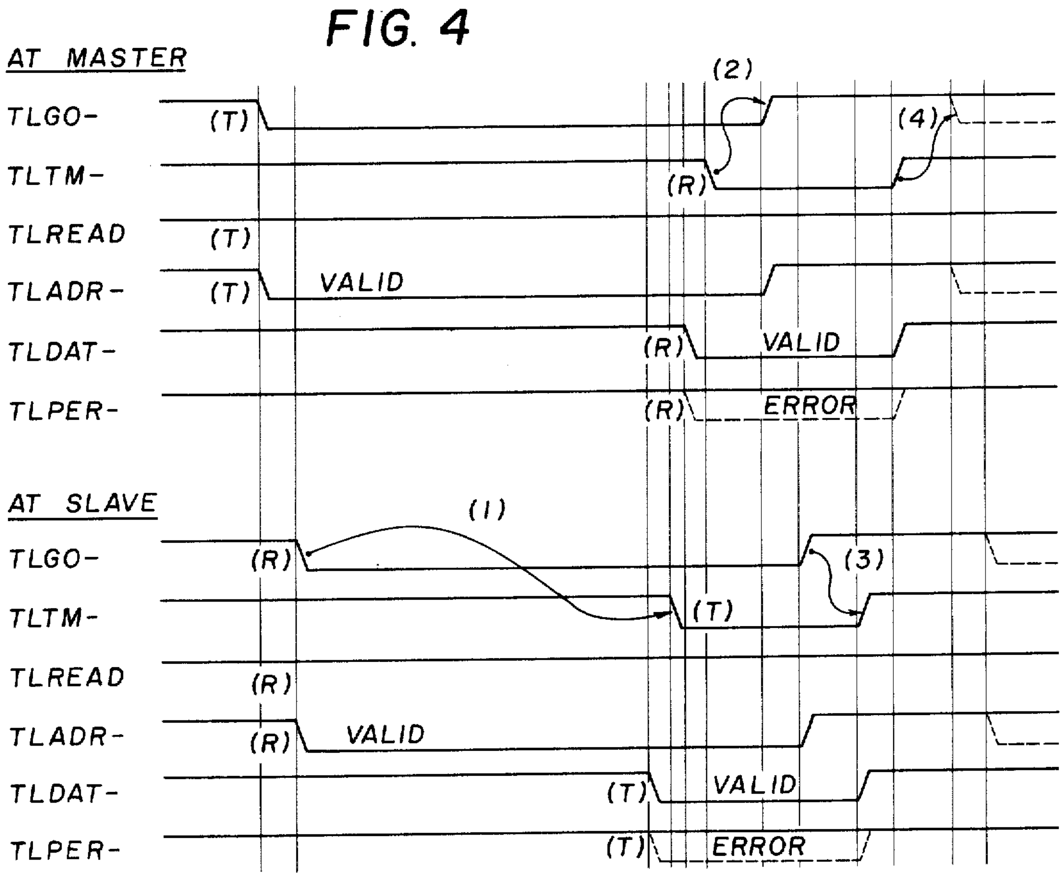
FIG. 4 is a timing diagram of a memory read operation.

FIGURES 3 and 4

FIG. 3 is a timing diagram of a memory write operation involving the above signals. FIG. 4 is a timing diagram of a memory read operation.

In a master to slave write cycle, when a TILINE master device has access to the TILINE bus, it may accomplish a memory write cycle through the following action. The master asserts a TLGO- signal. At the same time, the master asserts a write command by pulling the TLREAD line low. The master also at this time generates valid TLDAT-, and a valid 20 bit TLADR- signal on lines 32 and 34, respectively.

All slave devices interfaced to the TILINE bus will receive the GO (TLGO-) signal transmitted from the master. The slave devices decode the address to determine which slave is being addressed. This is accomplished in the slave by generating a delayed GO (via a timer circuit) and using it to strobe for a valid address decode. In the case of a memory module, delayed GO and a valid address decode generate a memory start signal. The slave device delays GO for a sufficient time to account for the worst case address decode time and the worst case TILINE bus skew. When the slave device has delayed GO and decoded the address as valid, it then asserts the TLTM- signal. At the same time, the slave device clocks the WRITE DATA (TLDAT-), ADDRESS (TLADR-) and READ/WRITE control signals on line 33 from the TILINE bus into registers. The action described in the above paragraph happens during "time 1" of FIG. 3.

When the TILINE master device receives the asserted TERMINATE (TLTM-), it releases GO (TLGO-), READ (TLREAD), ADDRESS and WRITE DATA. This action occurs during "time 2" of FIG. 3.

When the slave device receives the release of GO, it must release TERMINATE. This is shown as "time 3" of FIG. 3.

When the master device receives the released TERMINATE, it may begin a new cycle or it may relinquish the TILINE bus to another master device. This is shown as "time 4" of FIG. 3.

In a master to slave read cycle, when a TILINE master device has access to the TILINE bus, it may accomplish a memory read cycle through the following action. The master asserts TLGO- signal and a valid TLADR- signal.

All slave devices will receive the GO transmitted by the master. The slave devices delay GO and decode the address as for a write cycle. The slave device delays GO for a sufficient time to account for the worst case TILINE bus skew and worst case address decode time. When this is done and the address is decoded as valid the slave device will begin to generate read data. In the case of a memory module this means starting a read cycle. When the READ DATA state on line 31 of FIG. 2 is valid, the slave device asserts TLTM-. If a read error is detected during a read cycle, the TLPER- signal is asserted by the slave. This signal has the same timing that TLDAT- signals would have. This action takes place during "time 1" of FIG. 4.

When the TILINE master device receives the asserted TLTM-, it delays for worst-case TILINE bus skew and then releases GO and the ADDRESS. As the master device releases GO, it clocks the READ DATA on the TILINE bus into a register. This occurs during "time 2" of FIG. 4.

When the slave device receives the released GO, it releases TLTM- and TLDAT-. This is shown as "time 3" of FIG. 4.

When the master device receives the released TLTM- signal, it may begin a new cycle or it may relinquish the TILINE bus to another master device. This is shown as "time 4" of FIG. 4.

In acquisition of bus mastership, the three signals, TLAG-, TLAK-, and TLAV are exclusively utilized by TILINE master devices. Their purpose is to schedule the next TILINE master during the last I/O operation of the present TILINE master.

FIGURE 5

Figure 5:
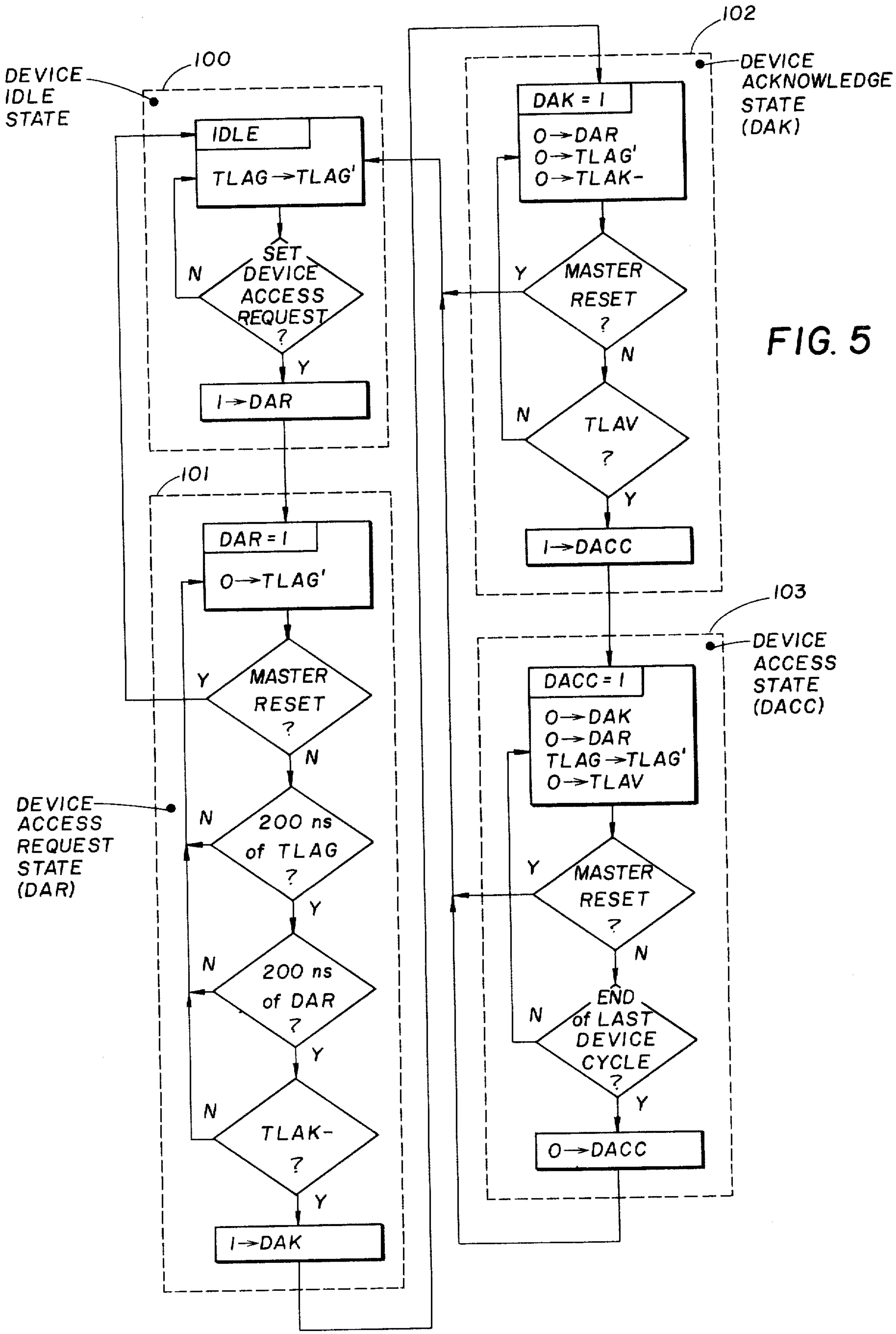
FIG. 5 is a flow diagram for operation of the master access logic of FIG. 2.

Every TILINE master device has an identical master logic of the construction shown in FIG. 2. FIG. 5 is a flow chart illustrating operation of the access logic of FIG. 2.

When a TILINE master device is inactive or reset, its master access logic will be in the idle state 100. In state 100, a signal TLAG is passed on to the lower priority master devices, and the master access logic monitors a SET DEVICE ACCESS request signal from its device controller as indicated in the idle state portion 100 of FIG. 5.

As soon as a device controller generates a SET DEVICE ACCESS request signal on line 50, FIG. 2, indicating that it wants to obtain TILINE bus access, the master access logic changes from the idle state to the DAR state 101, FIG. 5.

In state 101, the access logic monitors TLAG signals and TLAK- signals. The master logic also disables TLAG to lower priority devices.

TLAG is required to be stable for at least 200 nanoseconds. At the end of such period if the master logic has been in the DAR state for at least 200 nanoseconds, then when TLAK- is true, the master access logic will change to the DAK state 102.

In the state 102, the master access logic continues to disable TLAG to lower priority master devices and pulls line 43 low. In this state, the master access logic monitors TLAV on line 42. When line 42 becomes true, the master access logic changes to the DEVICE ACCESS STATE (DACC) 103.

In state 103, the TLAG signal is passed on on to lower priority master devices and the master access logic pulls line 42 low. In state 103, the master device has access to the TILINE bus and may perform data transfers to a slave device. During the last data transfer that the master device performs, it generates a LAST CYCLE signal which causes the master logic to return to the idle 100 state at the end of the data transfer.

In addition to the signals associated with data transfers and TILINE bus mastership, there are four signals with special functions. These signals are: TLIORES-, TLPFWP, TLPRES-, and TLWAIT-.

The TLIORES- is the signal generated by a computer during execution of its I/O reset instruction, or in response to a console reset switch. TLIORES- is a 250 nanoseconds negative pulse on a normally high line. It is part of the TILINE bus, and thus is available to all devices interfacing with the TILINE bus. Its function is to halt and rest all I/O devices. Such devices are reset in response to this signal and any memory cycle in progress is completed normally. For example, if a disc write is in progress, zero value data fills out the sector in progress. If a tape write is in progress, an end of record sequence occurs. When a device is reset while active, it may report abnormal completion status.

The TLPFWP signal is generated by a power supply to indicate that a power shut down sequence is about to occur. This signal is a positive pulse of about 1.5 milliseconds duration. The leading edge of this pulse causes the CPU to trap to the power failure trap location. This leading edge of TLPFWP causes the same effect in I/O devices as I/O master reset. TLPFWP signal is to be completed before TLPRES is asserted.

The TLPRES- signal is a normally high signal that goes low at least 10 microseconds before any DC power voltage begins to fail due to normal shut down or to AC power failure. TLPRES- is generated by the power supply. This signal maintains a path to Ground of less than one ohm during and after power failure. During AC power turn-on, TLPRES- will remain at Ground until after all DC power voltages are stable.

The purpose of TLPRES- is to reset all device controllers and the CPU during power failure, and to directly inhibit all critical lines to external equipment powered by a separate power supply. It is TLPRES- that, for instance, prevents a tape deck from getting a REWIND pulse when a CPU is powered up and down.

During the power up sequence, TLPRES- being low will reset all logic to their idle state and clear any device STATUS information. When TLPRES- goes high, indicating that power is up and stable, the CPU will perform a power-up interrupt trap.

The TLWAIT- signal resolves certain conflicts which can arise in computer to computer communication over the TILINE bus. It is a normally high signal generated by certain expanders and switches.

The purpose of TLWAIT- is to directly disable (inhibit) the following signals from all TILINE master devices including the CPU:

1. TLGO-
2. TLREAD
3. TLADR-
4. TLDAT- This function is not inhibited in slave devices.

These signals are to be disabled as long as TLWAIT- is at Ground. This action causes no state changes in master devices. Except for its interface drivers, the master device should not be "aware" that TLWAIT- is asserted.

TLWAIT- allows expanders and switches to exercise a "higher than any" priority on the TILINE.

FIGURE 6

Figure 6:
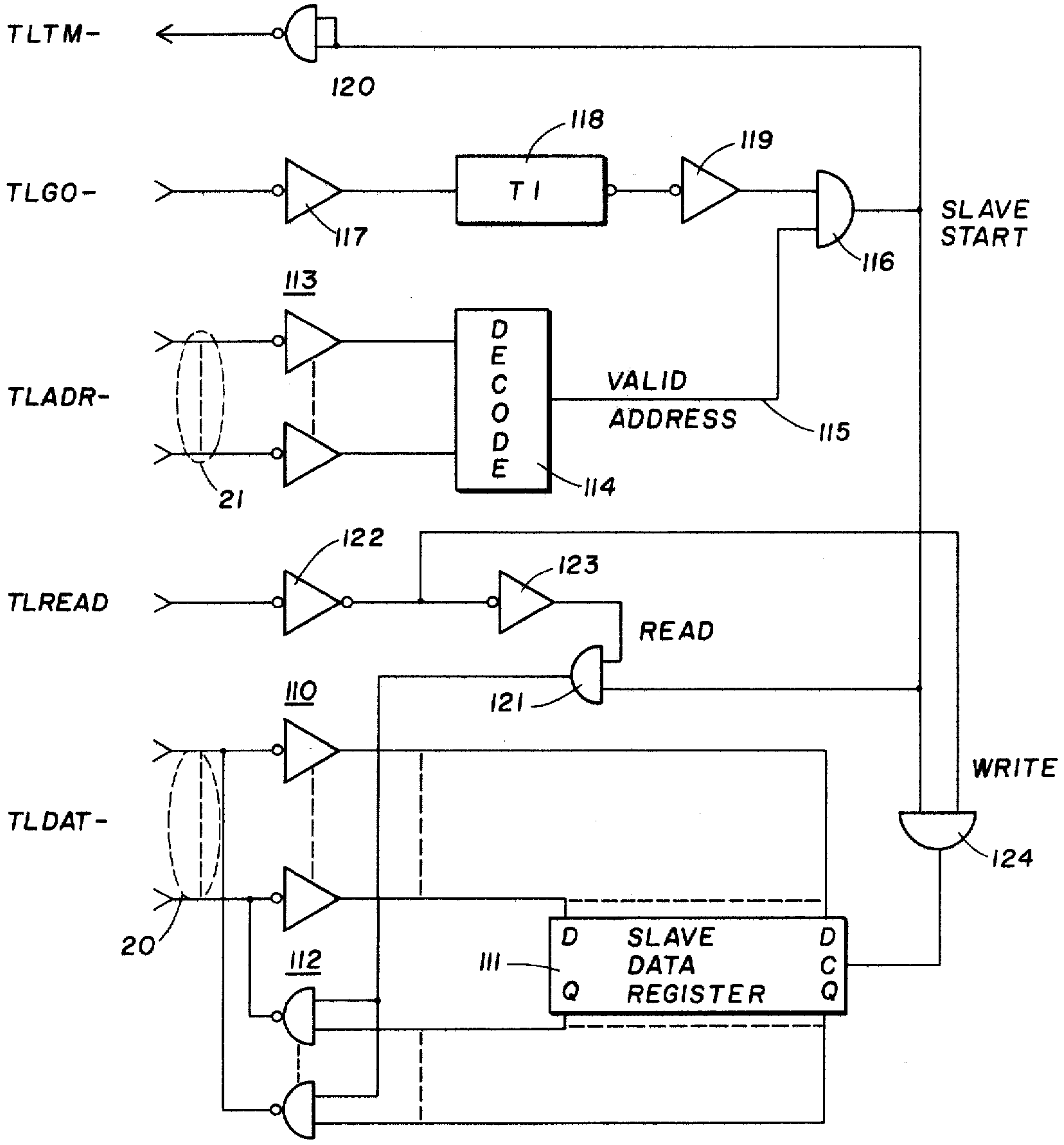
FIG. 6 illustrates a typical slave unit.

A diagram of a basic slave device is shown in FIG. 6. The data bus is connected through a bank of inverting receivers 110 to the D inputs of a slave data register 111. The Q output terminals are connected by way of a bank of NOR gates 112 back to the data bus 120. The address bus 21 is connected through a bank of inverting receivers 113 to a decode unit 114. The decode output line 115 is connected to an input of an AND gate 116. The second input to AND gate 116 is supplied from the TLGO- line to an inverting receiver 117 and a delay unit 118 followed by an inverter 119. The output of AND gate 116 is connected by way of a driver NAND gate 120 to the TLTM- line. It is also connected by way of AND gate 121 to the second input of each of the NAND gates in bank 112. The second input of AND gate 121 is supplied from a TLREAD line by way of a receiving inverter 122 and inverter 123. The output of inverter 122 is also connected to an input of an AND gate 124, the second input of which is supplied by the output of AND gate 116. The output of AND gate 124 is connected to the clock terminal of the data register 111.

The slave device illustrated is a 16 bit I/O interface register 111. It is addressed by a master device as a specific memory location. When a valid address decode is present after a delayed TLGO-, a SLAVE START SIGNAL is generated. TLGO- is delayed 100 nanoseconds. A delay of 50 nanoseconds is for skew and 50 nanoseconds is for address decode time. If TILINE READ is a high level, indicating a read from the slave data register, the read data drivers are enabled which places the slave register data on the TILINE TLDAT- lines. The generation of a TERMINATE signal occurs as soon as READ DATA is valid. If TILINE READ signal is low, indicating a write to the slave data register, the leading edge of SLAVE START signal is gated to the clock input of the slave data register. This clocks the TLDAT- signal from the master into the data register. TERMINATE signals may be asserted at the same time. If the slave device is a memory module, the SLAVE START signal will start a memory cycle and the TERMINATE signal will not be generated until after the read access time of the memory (for read cycles). For memory write cycles, the TERMINATE signal can be asserted by SLAVE START signal if write data, address data, and the read/write control are clocked into registers. The memory write cycle is completed while the TILINE is freed for some other data transfer.

In the embodiment shown in FIG. 2, the flip-flops 51, 52, 53 and 91 are of type 74 H74.

RC network 68 includes a resistor of 320 ohms and a capacitor of 1500 picofarads.

RC network 92 includes a resistor of 50 ohms and a capacitor of 470 picofarads.

RC network 87 includes a resistor of 3000 ohms and a capacitor of 0.0047 microfarads.

The unit accomplishes switching from one master to another in 60 nanoseconds as compared with 400 nanoseconds required by prior systems. This result stems from the fact that the line 44 is connected to line **44*a* through only logic unit 63. An access granted signal can be transmitted down line 44 with a delay of only one logic gate delay per master unit. As a result, the decision delays indicated in FIG. 5** occur concurrently or in parallel rather than in series as in prior systems.

It will be appreciated from the foregoing description that the system described wherein the data were all expressed in words of 16-bit lengths and address bits were of 20-bit word lengths. It will be readily appreciated that the width of the bus 10 can be expanded or contracted in order to accommodate operations in systems having different formats. Thus, the present example has been given as representative of such other systems.

Having described the invention in connection with certain specific embodiments thereof, it is to be understood that further modifications may now suggest themselves to those skilled in the art and it is intended to cover such modifications as fall within the scope of the appended claims.

What is claimed is:

1. An asynchronous bus for self-determined priority of communication among master computer devices communicating with slave devices through said bus where a multi bit data channel and a multi bit address channel are time shared by all of said devices, which comprises:

a. a logic circuit in each said master device
b. three signal lines common to all of said logic circuits in all of said master devices with one of said lines connected in series in the order of assigned priority between said master devices and the other two lines connecting said logic circuits in parallel.
c. means in each said master device to actuate each said logic circuit to limit access to said bus in the order of said priority and to signal availability status of said bus to all of said master devices.

2. The system of claim 1 wherein the logic circuit in all said master units is identical.

3. The system of claim 1 wherein said one of said lines includes a single logic gate in each master device thereby limiting the signal delay to one logic gate interval per master device.

4. An asynchronous bus apparatus for self-determining priority among a plurality of master computer devices each communicating with one or more slave devices through said bus, comprising:

a. a like logic circuit in each said master device; and
b. means to actuate each said logic circuit for assigning priority among master devices to limit access to said bus.

5. Asynchronous bus apparatus as set forth in claim 4, wherein:

a. said priority assigning means includes three signal lines of said bus common to all of said logic circuits.

6. The combination of claim 5 in which one of said three signal lines is connected in series in the order of assigned priority between said master devices.

7. The combination of claim 2 wherein one of said three signal lines is linked to said master devices by a single logic gate per master device thereby limiting signal delay to one logic gate interval per master device.

8. In a data processing system where information including data and instruction words are to be transferred over a communication bus from a plurality of units, the combination which comprises:

a. means for connecting all of said units in series along a control logic line in said bus in the order of assigned priority among said units,
b. means in at least one said unit to generate an access granted signal when said unit uses said bus, and
c. means in at least one said unit to transmit said signal to other units downstream of said user unit with only one logic gate delay per downstream unit.

9. In the operation of a bus interconnecting a plurality of master units vying for access to said bus for transfer of multi bit data and instruction words, the combination which comprises:

a. like arbitration logic means in each master unit;
b. means at each said unit, operatively connected to said logic means, for generating an access granted signal; and
c. means to apply said signal to said bus from the unit gaining access to said bus.

10. The combination set forth in claim 9 in which each said unit includes a decision logic means, each said decision logic means including a single logic gate to limit the signal delay to one logic gate delay per unit.

11. The method of information transfer between units of multi bit capability over a multichannel bus, the method which comprises:

a. connecting all said master units in series on one line of said bus in the order of assigned priorities between said units,
b. generating an access request signal at each master unit connected to said bus when access is sought,
c. generating an access granted signal by the unit of highest priority among units seeking access to said bus, and
d. transmitting said access granted signal to units down the priority stream with only one logic gate delay per downstream unit.

* * * * *